Inventor:
Harry R. Summerhayes Jr.,
by Charles W Helzer
His Attorney.

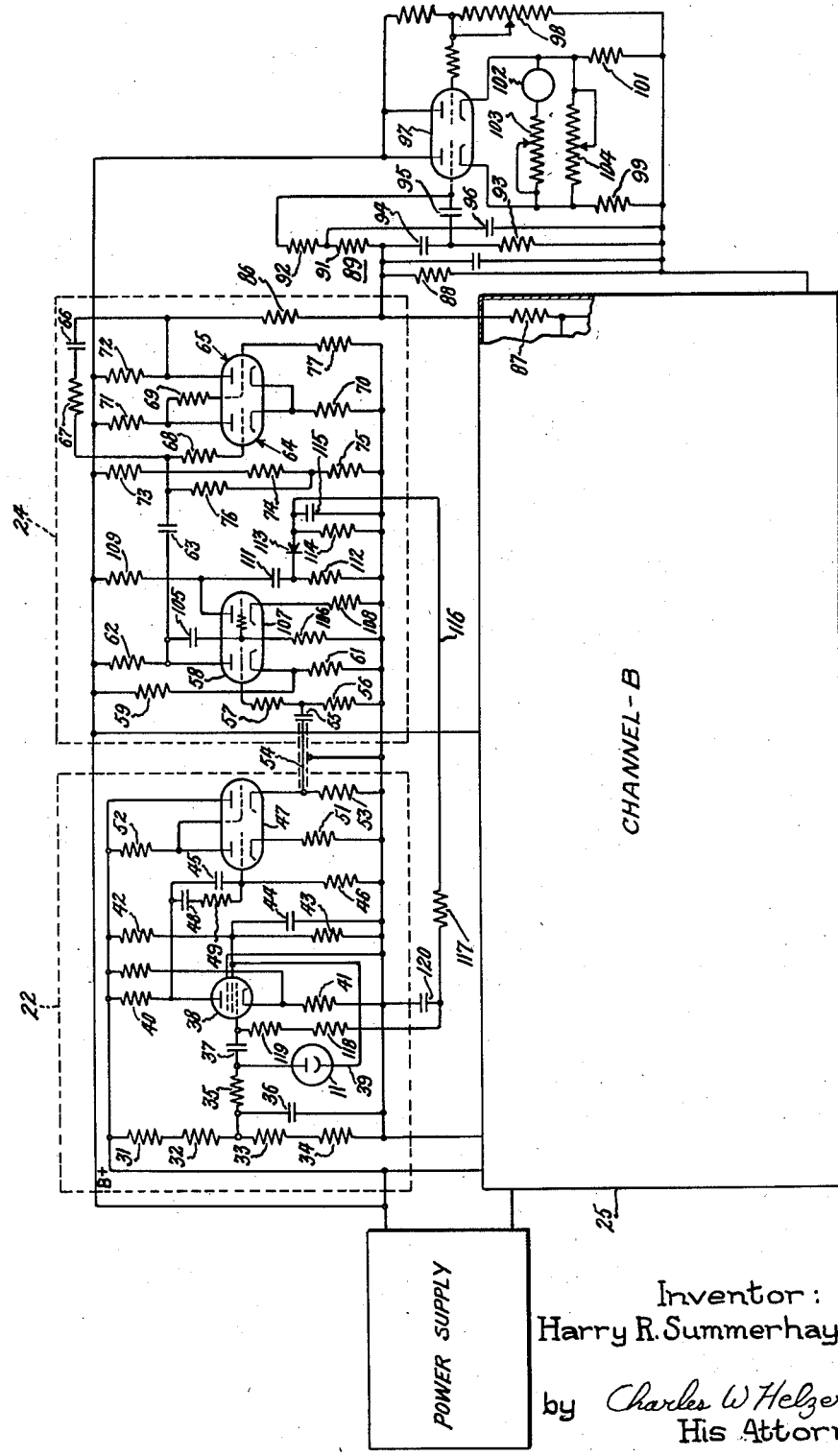

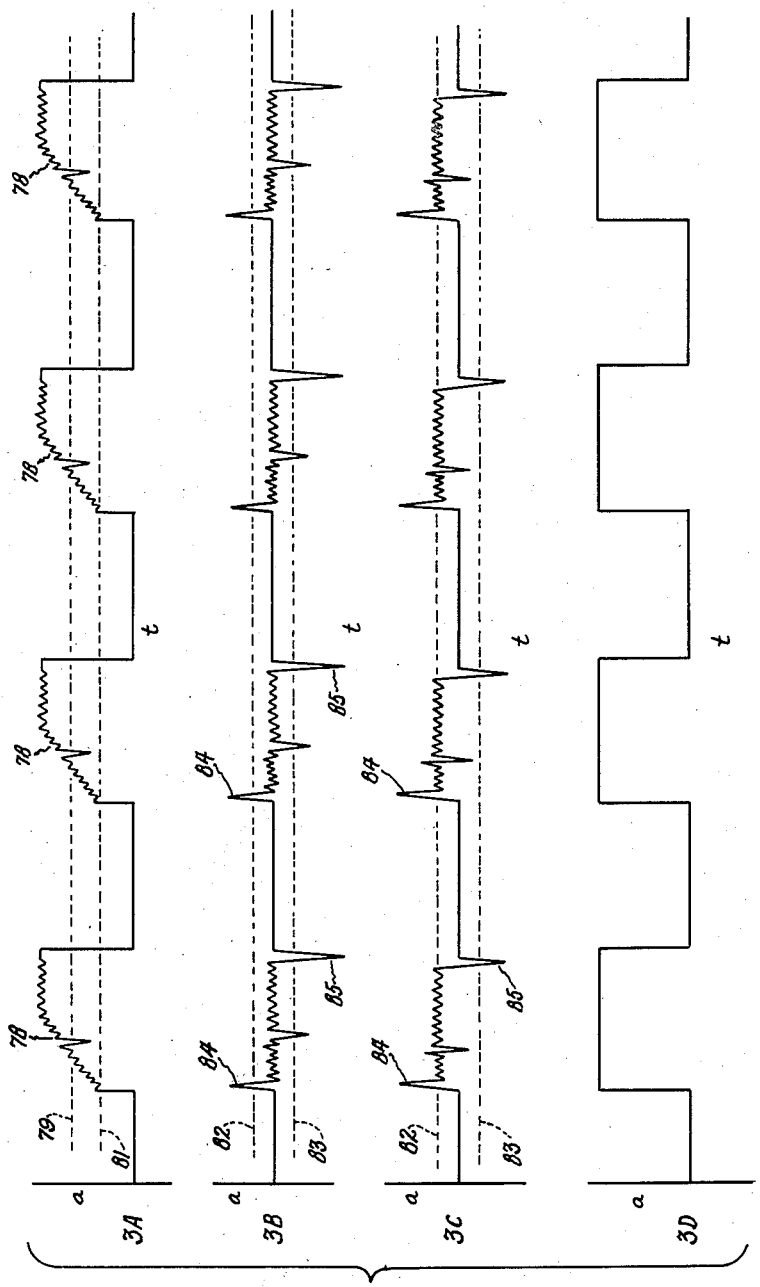

United States Patent Office 2,868,059
Patented Jan. 13, 1959

2,868,059

STEEL MILL OPTICAL WIDTH GAGE

Harry R. Summerhayes, Jr., Schenectady, N. Y., assignor to General Electric Company, a corporation of New York Application October 5, 1953, Serial No. 384,299

5 Claims. (Cl. 88—14)

The present invention relates to a non-contacting width gage.

More specifically, the invention relates to an improved non-contacting width gage incorporating a novel multivibrator triggering circuit and a new and improved phototube gain control circuit as a part thereof.

Non-contacting width gages of the type disclosed in applicant's copending application Serial No. 240,259, filed August 3, 1951, now Patent No. 2,791,921 have become relatively well-known in the industry, and while satisfactory for many purposes, they have not been entirely suitable for use in certain types of installations. In particular, the known non-contacting width gages have not been entirely suitable for use in mills for rolling out relatively wide strips of hot steel having temperatures ranging between 1350° F. to 2050° F. wherein cooling effects at the edge of the hot steel strip as well as scale on the steel strip, tend to produce false indications of the width of the strip. Further, because of the wide range of steel strip temperatures over which the gage must operate, the operation of known gages has not been entirely satisfactory at higher strip temperature values due to the fact that such gages use conventional automatic volume control circuits to effect gain control, and at the higher strip temperature values the automatic volume control bias is so great that it causes electron tubes in the circuit being controlled to be overdriven with resultant distortion of the output signal.

It is therefore one object of the present invention to provide a novel trigger circuit arrangement for a multivibrator, and a new and improved non-contacting width gage having the novel trigger circuit included therein wherein effects of edge cooling do not produce undesirable triggering action with a resultant false indication of width.

Still another object of the invention is to produce a novel trigger circuit arrangement for a non-contacting width gage which does not produce a false indication in response to the effect of scale on the hot steel strip being gaged.

A still further object of the invention is to provide a new and improved phototube gain control circuit for use in non-contacting width gages wherein the phototube is subjected to a wide range of luminosities caused by widely varying strip temperatures.

In practicing the invention, a photocell gain control circuit is provided which includes a photoelectric device, an electron discharge device having a plurality of control electrodes with the photoelectric device being coupled between two of the control electrodes of the electron discharge device, and means for providing a varying control electric signal to one of the tube control electrodes to which the photoelectric device is coupled. Also, in practicing the invention, a novel wave shaping circuit for a bi-stable multivibrator having two stable states of operation is provided. This circuit includes a differentiating circuit which is operatively coupled to the input of the bi-stable multivibrator, and a second conducting path operatively coupled to the input of the bi-stable multivibrator in parallel circuit relationship with the differentiating circuit for bypassing at least a portion of the undifferentiated input signal supplied to the input of the multivibrator in conjunction with the differentiating signal thus applied. In their preferred form, the above-identified circuit arrangements are included in a non-contacting width gage which comprises a pair of photoelectric devices positioned to view respective opposite edges of an object being gaged, together with means for scanning the view of each of the photosensitive devices in the direction of the width of the object so that the same are capable of producing substantially square wave shape alternating electric signals that are representative of the width of the object in the area of view of the respective photoelectric device. A photoelectric device gain control circuit is also included in the arrangement and comprises an electron discharge device having a plurality of control electrodes with each of the photoelectric devices being coupled between the two control electrodes of the respective electron discharge devices thereof, and means operatively coupled to one of the two control electrodes to which the photoelectric device is coupled for providing a varying gain control electric signal thereto. Respective wave shaping circuits are coupled to the output of each of the electron discharge devices, and each comprises a bi-stable multivibrator, a differentiating circuit coupled between the output of the electron discharge device and the respective multivibrator, and a second conductive path coupled between the output of the electron discharge device and the input to the multivibrator in parallel circuit relationship with the differentiating circuit. A common output indicating circuit is operatively coupled in common to the output of both of the said bi-stable multivibrators to provide an output indication of the width of the object being gaged.

Other objects, features, and many of the attendant advantages of this invention will be appreciated more readily as the same becomes better understood by reference to the following detail description, when considered in connection with the accompanying drawings, wherein like parts in each of the several figures are identified by the same reference character, and wherein:

Fig. 2 is a detailed circuit diagram of the width gage illustrated schematically in Fig. 1; and Fig. 3 is a series of voltage versus time plots of the signal voltages occurring in a portion of the steel mill width gage illustrated in Figs. 1 and 2.

Figure 1:
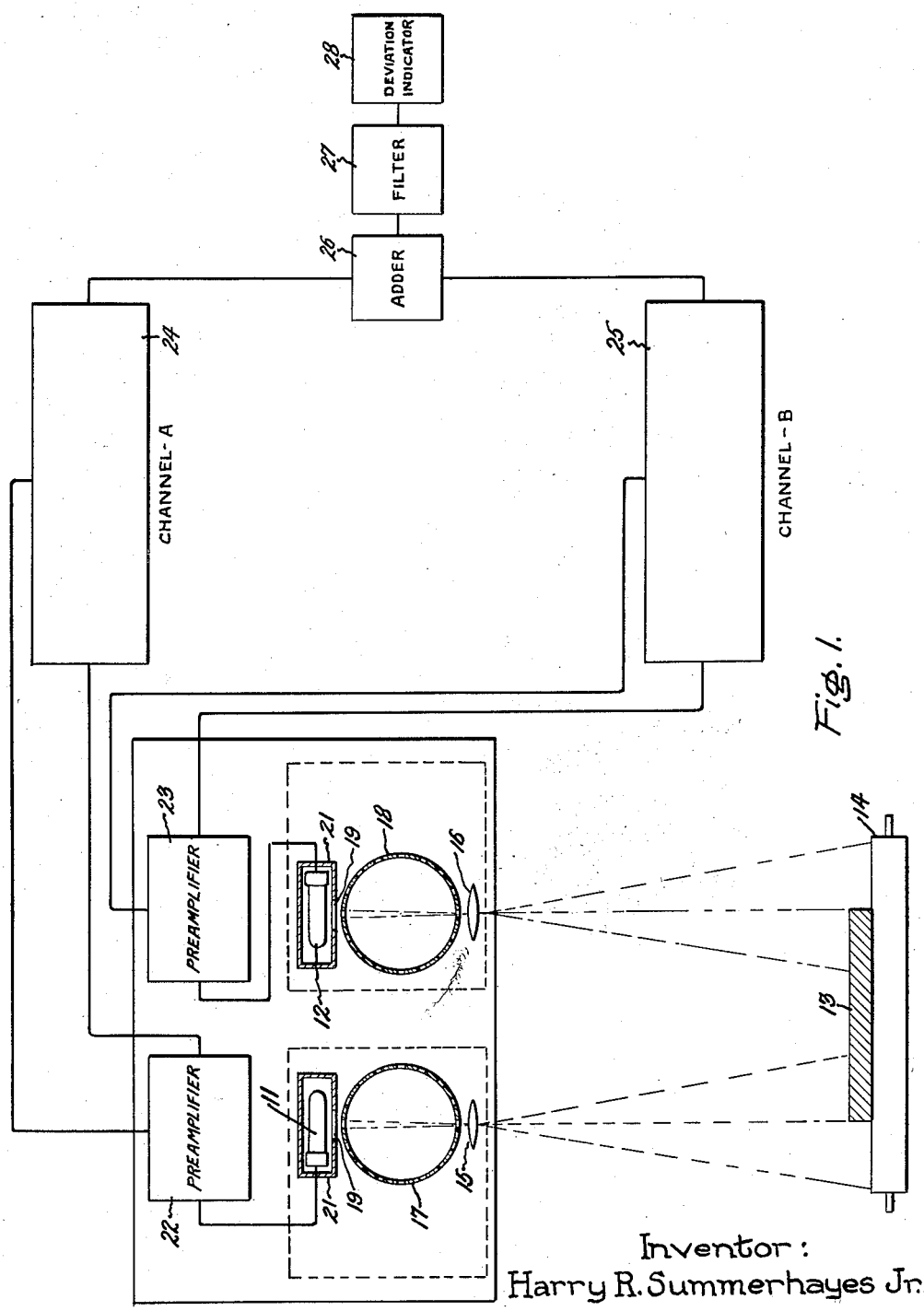
Fig. 1 is a schematic block diagram of an improved steel mill width gage constructed in accordance with the principles of the present invention.

The new and improved non-contacting width gage illustrated in Fig. 1 comprises a pair of photoelectric devices 11 and 12 which preferably comprise gas filled phototubes having a gas amplification factor by which the magnitude of the applied D. C. voltage controls the magnitude of the originally emitted photoelectric current. The phototubes 11 and 12 are positioned to view respective opposite edges of an object, such as a steel mill strip 13 disposed on rollers 14 through lenses 15 and 16, respectively. A means for scanning the view of each of the phototubes 11 and 12 in the direction of the width of the steel strip 13 is provided, and preferably comprises a pair of rotatable mechanical scanners 17 and 18, respectively. For a more detailed description of the construction and operation of the mechanical scanners 17 and 18, reference is made to the above-identified copending application; however, briefly, the rotatable mechanical scanners coact with a slit 19 in dust-tight housings 21 surrounding each of the phototubes 11 and 12, respectively, to provide a linear scanning movement over the edge of the steel mill strip 13 through an arc of travel such as is indicated by the dotted lines in Fig. 1 of the drawings. This scanning action serves to develop a substantially square wave electric signal in the output of the phototubes 11 and 12 which is indicative of the width of the object 13 in the area of view of the phototube. This square wave electric signal is developed due to the fact that the steel strip 13 is at an elevated temperature with respect to the background provided by rollers 14, and preferably is in the form of a red hot strip which emits light rays of a comparatively high amplitude in comparison to the background level of radiation. Hence, as the view of each of the photocells is swept back and forth across the edge of the strip 13, a substantially square wave electric signal is produced in the output of each of the phototubes.

The output electric signals developed by each of the phototubes 11 and 12 are coupled to the input of a pair of wave shaping preamplifiers 22 and 23, respectively, and from the preamplifiers to a pair of wave shaping channels 24 and 25, respectively. The construction and operation of the wave shaping preamplifiers and channels will be described more fully hereinafter; however, for the present it is sufficient to point out that the channels 24 and 25 serve to derive two separate square wave, pulsed electric signals whose pulse width is indicative of the width of the object being gaged. These square wave output signals are fed to a common output indicating circuit which includes an adder circuit 26 coupled to the input of a filter 27 which is in turn connected to a deviation indicator 28.

For a more detailed description of the construction and operation of the wave shaping preamplifiers 22 and channel 24, reference is now made to Fig. 2 of the drawings. As each of the wave shaping amplifiers 22 and 23, and each of the channels 24 and 25, are similar in construction, the description will be limited to only one of the amplifiers 22 and its corresponding wave shaping channel 24. The energizing potential is supplied to the phototube 11 from a resistance divider comprised of a plurality of series connected resistors 31, 32, 33, and 34 connected across a source of direct current potential supply B+. The collector electrode of the phototube 11 is connected to the potential divider 31—34 through a coupling resistor 35 and smoothing capacitor 36, and is connected through a coupling capacitor 37 to the control grid of a multielectrode electron discharge device comprising a pentode 38. The emitter electrode of the phototube 11 is connected through a suitable conductor 39 to the screen grid of the pentode 38, and suitable biasing potentials are supplied to the pentode from the source of direct current potential B+ through a plate load resistor 40, a cathode resistor 41, a resistance divider comprising resistors 42 and 43 which has a point thereon connected to the screen grid of pentode 38 and by passes to ground through a capacitor 44 audio frequency signals resulting from the scanning motion and a direct current connection between the suppressor grid of the pentode and ground.

The plate electrode of the pentode 38 is connected through a novel wave shaping circuit that comprises a differentiator composed of a capacitor 45 and a resistor 46 to the control grid of a two stage amplifier consisting of the two triode sections of a duo triode tube 47. In addition to the differentiator circuit, a second conductive path is provided between the plate electrode of the pentode 38 and the control grid of the first triode section of tube 47 in parallel with the differentiator circuit. This conductive path preferably comprises a D.-C. blocking capacitor 48 connected in series with an attenuating resistor 49, the series circuit thus comprised being connected in parallel with the differentiator circuit to the control grid of the first triode section of tube 47.

The first stage amplifier formed by the first triode section of tube 47 comprises a standard direct coupled amplifier having a cathode biasing resistor 51 and a plate load resistor 52, with the output thereof connected directly to the second stage amplifier which comprises a cathode follower amplifier having a cathode load resistor 53. The output signal developed across load resistor 53 is supplied through a coupling line 54 which, as is shown in Fig. 1 of the drawing, serves to couple the preamplifier section 22 to the wave shaping channel 24. The preamplified electric signal supplied through the coupling conductor 54 is applied through a coupling network comprising a capacitor 55, a resistor 56, and a resistor 57 to the control grid of the first triode section of a duo-triode tube 58 to which proper biasing potentials are supplied by a potential divider formed by a resistor 59 and a cathode load resistor 61 connected in series circuit relationship across the source of direct electric potential B+ and by a plate load resistor 62. The amplifier thus constructed serves to amplify the differentiated and recombined signal supplied thereto through coupling line 54, and to apply the amplified signal to two different output connections.

One of the output connections from the plate load resistor 62 of the first triode section of tube 58 is fed through a coupling capacitor 63 to the input of a bistable multivibrator comprised of two triode sections 64 and 65 of a duo-triode tube. The bi-stable multivibrator 64, 65 is of standard construction and has the plate of triode section 65 connected to the control grid of the triode section 64 through a coupling capacitor 66 and resistors 67 and 68, respectively, while the anode of triode section 64 is connected to the control grid of triode section 65 through a coupling resistor 69. The triode sections have a common cathode load resistor 70, and separate plate load resistors 71 and 72, respectively. A suitable bias potential is applied to the control grid of the triode section 64 from a voltage divider comprised of a plurality of series connected resistors 73, 74, and 75 coupled to the said control grid through a coupling resistor 76 and resistor 68 while a proper bias is supplied to the control grid of the triode section 65 from a potential divider composed of the plate load resistor 71 of triode section 64 the coupling resistor 69, and a resistor 77 connected between the control grid and ground. The potential applied to each of the control grids is such that either the triode section 65 is conducting or the triode section 64 is conducting, depending upon which condition the last triggering pulse supplied to the multivibrator leaves it. Upon application of a voltage pulse to the control grid of the triode section 64, the condition of that triode section is changed to render it either conductive or non-conductive and the condition of triode section 65 is likewise changed due to a voltage pulse applied to the control grid thereof through the coupling resistor 69 and to a voltage pulse applied to the cathode through the common cathode resistor 70. This condition is maintained until the next succeeding voltage pulse is applied to the control grid of the triode section, in which event the condition of triode section 64 is again changed to thereby return the bi-stable multivibrator to its initial condition to complete a cycle of operation. Succeeding voltage pulses repeat the cycle.

The wave shape of the sequence of electric signals occurring in the above-described portions of the width gage, is illustrated in Fig. 3 of the drawings wherein Fig. 3A shows a substantially square wave electric signal produced by the phototube 11 and amplified by pentode amplifier 38. This electric signal has a sloping leading edge such as shown at 78 due to the effects of edge cooling of the hot strip steel observed by the phototube. In the previously known arrangement set forth in the above-identified copending application, Serial No. 240,259, now Patent No. 2,791,931, the mid portion of the electric signal having a wave shape such as shown in Fig. 3A, was clipped out between the levels indicated at 79 and 81, and this mid portion used to derive an indication of the width of the strip being gaged. As is apparent from Fig. 3A, however, the edge cooling effect alters the width of the mid portion of the square wave signal, so that an erroneous reading of the width is obtained by this method. For this reason the system was not sufficiently accurate to be relied upon for all types of installations in which the gage might be used. To overcome this defect, it was suggested that the signals shown in Fig. 3A be differentiated to produce an output signal such as shown in Fig. 3B, and the differentiated wave used to trigger off a multivibrator such as 64, 65. The multivibrator triggers at certain predetermined levels, as illustrated by the lines 82 and 83, so that upon the occurrence a leading voltage pip 84, which corresponds in time to the leading edge of the substantially square wave shaped signal shown in Fig. 3A, the multivibrator is triggered from one of its stable states of operation to a second, and upon the occurrence of the trailing voltage pip 85 of the differentiated wave, the multivibrator is triggered back to its initial state of operation. While a system of this nature is theoretically capable of accurate operation, under actual conditions the substantially square wave shown in Fig. 3A has certain transit impulses occurring therein due to the effect of scale on the hot strip steel being gaged. Upon differentiating of the square wave-shape signal then, relatively large amplitude pip waveform voltage peaks are obtained which, in the instance shown in Fig. 3B, might be sufficiently large to falsely trigger the multivibrator 64, 65, and hence result in the production of an erroneous indication of width. In order to overcome this last mentioned difficulty, the wave shaping circuit comprising a part of the present invention was developed. This wave shaping circuit comprises the differentiator circuit formed by capacitor 45 and resistor 46, and the D.-C. blocking capacitor 48 and attenuating resistor 49 connected in parallel circuit relationship therewith in the input of two stage amplifier 47. By reason of this connection, a certain portion of the undifferentiated input signal shown in Fig. 3A is coupled through the attenuating resistor 49 and D.-C. blocking capacitor 48 to the control grid of the first stage of amplifier 47 along with the differentiated signal supplied through differentiator circuit 45 and 46. In this manner, the reference level of the differentiated voltage peaks occurring because of scale are raised to a point that the negative going portion of such voltage peaks does not extend to the trigger level of the multivibrator, and hence cannot falsely trigger the multivibrator. The resulting waveform is shown in Fig. 3C of the drawings. In Fig. 3C it can be seen that the leading positive going voltage peak 84 will trigger the multivibrator from one of its stable states of operation to the other and subsequent undesired positive going voltage peaks due to scale will not affect it due to the inherent nature of the multivibrator. The negative going portions of such transient voltage peaks have been lifted by the portion of the signal reinserted by capacitor 48 and resistor 49, that is, the absolute amplitude of the negative going peaks have been raised to a point such that they do not extend to a sufficiently low value to trigger the multivibrator back to its initial state of operation, and only the negative going voltage peaks 85 occurring at the trailing edge of the substantially square wave signal shown in 3A extends to a sufficiently low value to produce such a triggering action.

From the foregoing description, it can be appreciated that the photoelectric device in each of the scanning channels serves to develop a substantially square waveshape signal such as that shown in Fig. 3A. This signal is amplified by amplifier 38, and supplied to the wave shaping circuit comprising differentiator 45, 46 and attenuating resistor 49 connected in parallel to the input of amplifier 47. The wave shaping circuit serves to differentiate the signal shown at Fig. 3A, and to reinsert a portion of the undifferentiated signal back into the differentiated signal to serve as a base or floor thereby resulting in the composite waveform signal shown in Fig. 3C. This composite waveform signal is amplified by amplifier 47, supplied through coupling conductor 54, and further amplified by amplifier 58 before being applied to the input of multivibrator 64, 65 to control the operation thereof. The resulting square wave signal produced at the output of the multivibrator is shown in Fig. 3D of the drawings and provides a reliable indication of the width of the substantially square wave input pulse developed by photoelectric device 11, and hence the width of the portion or side of the steel strip being viewed. A similar signal is available at the output of channel 25 which is identical in construction and operation to the above-described channel. Hence by properly combining the two square wave signals produced by the multivibrators in each channel, an output indication of the total width of the strip being gaged can be obtained.

The square wave output signal produced by the multivibrators in each of the channels 24 and 25 are supplied through coupling resistors 86 and 87 respectively to a common output indicating circuit which includes a totalling resistor 88. Totalling resistor 88 is in turn connected through an integrating or smoothing filter 89 that includes a plurality of resistors 91, 92, 93 connected in a dual T network arrangement with a plurality of capacitors 94, 95, 96. The filter network 89 is connected to the control grid of one triode section of a two triode differential amplifier 97 having the control grid of the remaining triode section thereof connected to a source of reference potential comprising a resistance voltage divider 98 connected between the source of D.-C. positive potential B+ and ground. Separate load resistors 99 and 101 are connected in the cathode circuits of each of the triode sections of the differential amplifier 97, and a suitable indicating instrument of the moving coil galvanometer type 102 is interconnected between the cathode load resistors along with adjustable calibrating resistors 103 and 104.

By this construction, the combined square wave output of each of the multivibrators 64, 65 in both channels 24 and 25 is applied through the totalizing resistor 88 and through the integrating filter network 89 to the control grid of one of the triode sections of the differential amplifier 97 and compared in magnitude to the reference potential obtained in the voltage divider 98. If this reference potential is initially set to indicate a predetermined width and the steel strip being gaged is on gage, each of the triode sections will conduct an equal amount of current, no difference in potential will exist across the load resistors 99 and 101, and hence no indication of deviation will be derived from indicating meter 102. However, should the width of the strip being gaged deviate from desired value, the amount of conduction occurring in the first triode section of tube 97 to which the output of the multivibrators is applied, will be either less or more than the conduction occurring in the second triode section, thereby producing a difference of potential across the cathode load resistors 99, 101 which will appear as an indication on the indicating meter 102. The amount of deviation of the indicating meter 102 will be an indication of the deviation of the width of the strip from a desired standard.

In order that the width gage be satisfactory for use in gaging strips having widely varying temperature values, and, hence, widely varying luminosities, a connection is provided from the plate electrode of the amplifier 58 through a differentiating circuit comprising a capacitor 105 and resistor 106 to the control grid of an amplifier 107 having a cathode biasing resistor 108 and a plate load resistor 109. The amplifier 107 serves to amplify the doubly differentiated output signal from the amplifier 58, and this amplified, differentiated signal is fed through a resistance-capacitance coupling circuit comprising a capacitor 111 and a resistor 112 to a diode detector 113 having a smoothing filter circuit connected in its output. The filter circuit is formed by a resistor 114 and a capacitor 115 connected in parallel circuit relationship, and has a relatively slow time constant. The output of the filter circuit is connected through a conductor 116 and a suitable resistance-capacitance coupling network to further filter out the scanning signal frequencies comprising resistors 117, 118, and 119 and capacitor 120, back to the control grid of the pentode amplifier 38 in the preamplifier circuit arrangement.

The operation of the automatic gain control circuit thus constructed, and its advantages over previous circuits of the same nature, will be more apparent after a reading of the following discussion: In conventional amplifier automatic gain control circuits, the gain of the amplifier is controlled automatically by a feedback system which compares the transient signal amplitude of the amplifier with a standard amplitude, and utilizes the difference as a gain controlling factor to vary a grid bias voltage of an electron discharge tube included in the circuit being controlled. In the case of width gages, however, where the range of the input signals is very large, about 30 to 1 or more, this kind of control was found to be inadequate due to the fact that the maximum input signal level required such a large automatic gain control bias to produce a proper output that the input amplifier was cut off during a portion of the alternations occurring in the input signal. Thus, undesired distortion of the input signal would occur. In order to eliminate this source of distortion, and yet retain control over the gain of the circuit, the above-described double acting automatic gain control system was devised wherein, in addition to the usual automatic grid bias control provided by conventional automatic gain control circuits, the above-described circuit provides an additional control due to the fact that the emitter electrode of the phototube 11 is connected to the screen grid of the pentode amplifier 38 while the collector electrode of the phototube 11 is connected to a fixed source of potential, namely, the resistance voltage divider 31—34. Upon the occurrence of a large signal on the input of the amplifier 38, the automatic gain control signal developed by rectifier 113 and fed back through conductor 116, causes the control grid bias of amplifier 38 to become more negative by a relatively few volts. This action in turn causes the screen voltage of tube 38 to rise by a matter of 30 or 40 volts. Because the emitter electrode of the phototube 11 is connected to the screen grid it likewise rises in potential an equal amount, thereby reducing the phototube sensitivity, and hence the value of the input signal. Consequently, it can be appreciated that the automatic gain control circuit provided by the present invention is double acting in the sense that it reduces both the signal amplitude as well as the gain of the first stage amplifier of the circuit to provide proper output voltage without undesirable distortion.

The applied input signal stabilized in the above-described manner, is fed through the wave shaping circuit comprising differentiator 45, 46 and the parallel conductive path composed of capacitor 48 and resistor 49 to produce a composite output signal such as shown in Fig. 3C of the drawing. This composite differentiated signal with the reinserted base portion is then supplied through the coupling conductor 54 and amplifier 58 to the control grid of first triode section 64 of multivibrator 64, 65 where it serves to control the action of the multivibrator, and causes the same to produce an output square wave signal having a pulse width proportional to the width of the object being gaged in the previously described manner. The outputs of both channels 24 and 25 of the steel mill width gage are then combined in the totalizing resistor 93 and fed through integrating filter networks 89 to the differential amplifier 97 where the combined signals are compared with the reference potential picked off voltage divider 98 to provide an indication of any deviation in width of the object being gaged from a predetermined standard.

From the foregoing description, it can be appreciated that the invention provides a new and improved non-contacting width gage which incorporates as a part thereof a novel wave shaping input circuit arrangement for a multivibrator which overcomes the effects of edge cooling with regard to the operation of the multivibrator, and does not produce false responses thereof due to the appearance of scale on the object being gaged. In addition, the invention provides a greatly improved phototube gain control circuit which allows the non-contacting width gage to be used with objects having a wide range of luminosities.

In a preferred embodiment of applicant's novel width gage circuit, the parameters of the circuit had the below listed values. It should be especially noted that the values cited are for examples only, and that the invention is not to be construed as limited to the parameters listed.

*Resistors*

| | | |
|---|---|---|
| Resistor 31 | megohms | 8.2 |
| Resistor 32 | do | 2.2 |
| Resistor 33 | do | 2.2 |
| Resistor 34 | do | 2.2 |
| Resistor 35 | do | 1.5 |
| Resistor 40 | do | .1 |
| Resistor 41 | ohms | 470 |
| Resistor 42 | megohms | 27 |
| Resistor 43 | do | 15 |
| Resistor 46 | do | .1 |
| Resistor 49 | do | 10 |
| Resistor 51 | ohms | 2200 |
| Resistor 52 | megohms | .27 |
| Resistor 53 | kiloohms | 39 |
| Resistor 56 | megohms | .1 |
| Resistor 57 | do | .47 |
| Resistor 59 | do | .1 |
| Resistor 61 | ohms | 470 |
| Resistor 62 | megohms | .22 |
| Resistor 67 | do | 15 |
| Resistor 68 | do | 1.0 |
| Resistor 69 | do | 1.0 |
| Resistor 70 | kiloohms | 47 |
| Resistor 71 | megohms | 47 |
| Resistor 72 | do | 47 |
| Resistor 73 | do | .12 |
| Resistor 74 | kiloohms | 53 |
| Resistor 75 | do | 10 |
| Resistor 76 | megohms | 1 |
| Resistor 77 | kiloohms | 150 |
| Resistor 86 | megohms | 4.7 |
| Resistor 87 | do | 4.7 |
| Resistor 88 | do | 1.8 |
| Resistor 91 | do | 1.5 |
| Resistor 92 | do | 1.5 |
| Resistor 93 | kiloohms | 680 |
| Resistor 98 | do | 14.4 |
| Resistor 99 | do | 15 |
| Resistor 101 | ohms | 15 |
| Resistor 102 | kiloohms | 11 |
| Resistor 103 | ohms | 5800 |
| Resistor 104 | do | 8600 |
| Resistor 106 | megohms | 1.0 |
| Resistor 108 | ohms | 4700 |
| Resistor 109 | do | 6800 |
| Resistor 112 | megohms | .1 |
| Resistor 114 | do | 1.0 |
| Resistor 117 | do | 3.3 |
| Resistor 118 | do | 22 |
| Resistor 119 | do | 10 |

Capacitors

| | μμfd. |
|---|---|
| Capacitor 36 | .001 |
| Capacitor 37 | .001 |
| Capacitor 44 | 1.0 |
| Capacitor 45 | .0002 |
| Capacitor 48 | .1 |
| Capacitor 55 | 1.0 |
| Capacitor 63 | .01 |
| Capacitor 66 | .01 |
| Capacitor 94 | .0036 |
| Capacitor 95 | .0036 |
| Capacitor 96 | .0075 |
| Capacitor 105 | .0002 |
| Capacitor 111 | .1 |
| Capacitor 115 | .05 |
| Capacitor 120 | .25 |

Tubes

| No. | Mfgr. | Type |
|---|---|---|
| 11 | Gen. Elec. | GL918 |
| 38 | Gen. Elec. | 6SJ7 |
| 47 | Gen. Elec. | 6SN7 |
| 58 | Gen. Elec. | 6SL7 |
| 64, 65 | Gen. Elec. | 6SL7 |
| 97 | Gen. Elec. | 6SN7 |

Obviously, other modifications and variations of the present invention are possible in the light of the above teachings. It is therefore to be understood that changes may be made herein which are within the full intended scope of the invention as defined by the appended claims.

What I claim as new and desire to secure by Letters Patent of the United States is:

1. A non-contacting width gage including in combination a pair of photoelectric devices positioned to view respective opposite edges of an object being gaged, means for scanning the view of each of said photoelectric devices in the direction of the width of said object to thereby produce substantially square wave shape alternating electric signals which are representative of the width of the object in the area of view of the respective photoelectric device, a first conductive path including a pair of photoelectric device gain-control circuits each including an electron discharge device having a plurality of control electrodes, each of said photoelectric devices being coupled between two control electrodes of its respective electron discharge device, means operatively coupled to one of the two control electrodes of each of said electron discharge devices to which the associated photoelectric device is coupled for providing varying control electric signals thereto to thereby control the sensitivity of the respective photoelectric device, respective wave-shaping circuits coupled to the output of each of said electron discharge devices, each of said wave-shaping circuits including a bi-stable multivibrator, a differentiating circuit coupled between the output of the electron discharge device and its respective multivibrator, and a second conductive path coupled between the output of the electron discharge device and the input to the multivibrator in parallel circuit relationship with the differentiating circuit, and a common output indicating circuit operatively coupled to the output of both of said bi-stable multivibrators.

2. A non-contacting width gage including in combination a pair of photoelectric devices positioned to view respective opposite edges of an object being gaged, means for scanning the view of each of said photosensitive devices in the direction of the width of said object to thereby produce substantially square wave shape alternating electric signals which are representative of the width of the object in the area of view of the respective photoelectric device, a first conductive path including a pair of photoelectric device gain-control circuits each including an electron discharge device having at least control grid and screen grid electrodes, each of said photoelectric devices being coupled between the control grid and screen grid electrodes of its respective electron discharge device, means operatively coupled to the control grid electrode of said electron discharge device for providing varying control electric signals thereto, respective wave-shaping circuits operatively coupled to the output of each of said electron discharge devices, each of said wave-shaping circuits including a bi-stable multivibrator, a differentiating circuit coupled between the output of the electron discharge device and its respective multivibrator, and a second conductive path coupled between the output of the electron discharge device and the input to the multivibrator in parallel circuit relationship with the differentiating circuit, and a common output indicating circuit operatively coupled to the output of both of said bi-stable multivibrators.

3. A non-contacting width gage including in combination a pair of photoelectric devices positioned to view respective opposite edges of an object being gaged, means for scanning the view of each of said photoelectric devices in the direction of the width of said object to thereby produce substantially square wave shape alternating electric signals which are representative of the width of the object in the area of view of the respective photoelectric device, a first conductive path including a pair of photoelectric device gain control circuits each including an electron discharge device having at least control grid and screen grid electrodes, each of said photoelectric devices being coupled between the control grid and screen grid electrodes of its respective electron discharge device, a pair of rectifier networks each having the input thereof operatively coupled to the output of its respective electron discharge device and having the output thereof connected to the control grid of said electron discharge device through a long time constant circuit, respective wave-shaping circuits coupled to the output of each of said electron discharge devices, each of said wave-shaping circuits including a bi-stable multivibrator, a differentiating circuit coupled between the output of the electron discharge device and its respective multivibrator, and a second conductive path including an attenuating impedance coupled between the output of the electron discharge device and the input to the multivibrator in parallel circuit relationship with the differentiating circuit, and a common output indicating circuit operatively coupled to the output of both of said bi-stable multivibrators.

4. A non-contacting width gage including in combination a pair of photoelectric devices positioned to view respective opposite edges of an object being gaged, means for scanning the view of each of said photoelectric devices in the direction of the width of said object to thereby produce substantially square wave shape alternating electric signals in the output of each of the photoelectric devices which are representative of the width of the object in the area of view of the respective photoelectric device, a first conductive path including respective bi-stable multivibrators operatively coupled to the output of each of said photoelectric devices, wave shaping circuits coupled between the output of each of said photoelectric devices and the respective multivibrators thereof, each of said wave shaping circuits including a differentiating circuit coupled between the output of the photoelectric device and its respective multivibrator, and a second conductive path coupled between the output of the photoelectric device and the input to the multivibrator in parallel circuit relationship with the differentiating circuit, and a common output indicating circuit operatively coupled to the output of both of said bi-stable multivibrators.

5. A non-contacting width gage including in combination a pair of photoelectric devices positioned to view respective opposite edges of an object being gaged, means for scanning the view of each of said photoelectric devices in the direction of the width of said object to thereby produce substantially square wave shape alternating electric signals in the output of each of the photoelectric devices which are representative of the width of the object in the area of view of the respective photoelectric device, a first conductive path including respective bi-stable multivibrators operatively coupled to the output of each of said photoelectric devices, wave shaping circuits coupled between the output of each of said photoelectric devices and the respective multivibrators thereof, each of said wave shaping circuits including a differentiating circuit coupled between the output of the photoelectric device and its respective multivibrator for applying a signal to the multivibration for triggering the same from one stable state of operation to the other, and a second conductive path including an attenuating impedance coupled between the output of the photoelectric device and the input to the multivibrator in parallel circuit relationship with the differentiating circuit reinserting a portion of the original signal into the differentiated signal supplied to the input of the multivibrator, and a common output indicating circuit operatively coupled to the output of both of said bi-stable multivibrators.

References Cited in the file of this patent
UNITED STATES PATENTS

| | | |
|---|---|---|
| 2,035,907 | McMaster et al. | Mar. 31, 1936 |
| 2,237,811 | Cockrell | Apr. 8, 1941 |
| 2,474,906 | Meloon | July 5, 1949 |
| 2,484,299 | Labrum | Oct. 11, 1949 |
| 2,548,590 | Cook | Apr. 10, 1951 |
| 2,609,499 | Gilson | Sept. 2, 1952 |
| 2,617,932 | Coughlin | Nov. 11, 1952 |
| 2,653,237 | Johnstone et al. | Sept. 22, 1953 |
| 2,659,823 | Vossberg | Nov. 17, 1953 |
| 2,674,915 | Anderson | Apr. 13, 1954 |